US012391141B1

(12) United States Patent
Gao et al.

(10) Patent No.: US 12,391,141 B1
(45) Date of Patent: Aug. 19, 2025

(54) LARGE-SCALE ELECTRIC VEHICLE CLUSTER COORDINATED CHARGING OPTIMIZATION METHOD BASED ON GREEDY REPAIR GENETIC ALGORITHM

(71) Applicant: SHANDONG UNIVERSITY, Jinan (CN)

(72) Inventors: Shuhua Gao, Jinan (CN); Jing Wang, Jinan (CN); Zhengfang Wang, Jinan (CN); Ruipeng Cui, Jinan (CN); Junhui Kou, Jinan (CN); Shuo Wang, Jinan (CN); Lei Jia, Jinan (CN); Qingmei Sui, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/011,682

(22) Filed: Jan. 7, 2025

(30) Foreign Application Priority Data

Aug. 2, 2024 (CN) .......................... 202411053069.0

(51) Int. Cl.
*B60L 53/64* (2019.01)
*B60L 53/62* (2019.01)
(Continued)

(52) U.S. Cl.
CPC ............... *B60L 53/64* (2019.02); *B60L 53/62* (2019.02); *B60L 53/63* (2019.02); *B60L 53/67* (2019.02);
(Continued)

(58) Field of Classification Search
CPC .......................................... G06Q 10/00–90/00
See application file for complete search history.

(56) References Cited

U.S. PATENT DOCUMENTS

2023/0089840 A1* 3/2023 Wiegman ................ B60L 53/65
320/109
2023/0415600 A1* 12/2023 Sankar .................. H02J 7/0013

FOREIGN PATENT DOCUMENTS

CN          113580984 A         11/2021

OTHER PUBLICATIONS

CNIPA, Notification of a First Office Action for CN202411053069.0, Sep. 13, 2024.
(Continued)

*Primary Examiner* — Arif Ullah
(74) *Attorney, Agent, or Firm* — Hemisphere Law, PLLC; Zhigang Ma

(57) ABSTRACT

The disclosure relates to the technical field of power system management, and in particular to a large-scale electric vehicle cluster coordinated charging optimization method based on greedy repair genetic algorithm. the method includes the following steps: Si, establishing a task model: establishing a task model of electric vehicle cluster coordinated charging in large charging stations; S2, constructing constraint conditions: constructing constraint conditions for the coordinated charging optimization problem; S3, constructing a constrained optimization problem: designing an objective function with the minimum charging cost, performing linear mathematical transformation on non-linear constraint conditions, and constructing a 0/1 integer linear programming problem; and S4, solving the constrained optimization problem with a custom genetic algorithm based method: carrying out genetic coding on a decision model of the charging station, and specifically designing a genetic algorithm with greedy repair operators to solve the constructed constrained optimization problem.

9 Claims, 5 Drawing Sheets

(51) Int. Cl.
*B60L 53/63* (2019.01)
*B60L 53/67* (2019.01)
*G06Q 10/0631* (2023.01)
*G06Q 50/06* (2012.01)

(52) U.S. Cl.
CPC ....... *G06Q 10/06314* (2013.01); *G06Q 50/06* (2013.01)

(56) References Cited

OTHER PUBLICATIONS

Shandong University (Applicant), Replacement claims (allowed) of CN202411053069.0, Sep. 26, 2024.
CNIPA, Notification to grant patent right for invention in CN202411053069.0, Sep. 30, 2024.

* cited by examiner

LARGE-SCALE ELECTRIC VEHICLE CLUSTER COORDINATED CHARGING OPTIMIZATION METHOD BASED ON GREEDY REPAIR GENETIC ALGORITHM

TECHNICAL FIELD

The disclosure relates to a technical field of power system management, and in particular to a large-scale electric vehicle cluster coordinated charging optimization method based on greedy repair genetic algorithm.

BACKGROUND

The significance of making decisions for large-scale electric vehicle charging is that the charging time and the order of a large number of electric vehicles are reasonably scheduled, namely, coordinated charging is carried out, and the following actual problems are solved:

firstly, the safe and stable operation of the power distribution network meets the three-phase load balance degree constraint of the power distribution transformer and the total load constraint of each phase, line overload is avoided, safe operation of the power distribution transformer equipment is ensured; secondly, by reasonably scheduling the charging times of a large number of electric vehicles, it is possible to prevent the occurrence of a phenomenon known as "peak upon peak" in the electrical load. By implementing a coordinated charging strategy, the effect of "peak shaving and valley filling" can be leveraged, thereby reducing the fluctuation and peak-to-valley difference of the total electrical load; and finally, to reduce the charging costs for users, the flexibility of time-of-use electricity pricing and the freedom of users' charging times, particularly during nighttime charging, is fully utilized to minimize the charging expenses for electric vehicle users. Enhancing the "economic viability" of orderly charging, the reduction in charging costs can incentivize users to actively participate in coordinated charging programs. Concurrently, the "peak shaving and valley filling" effect can further optimize the electric load distribution.

In response to the issues of slow solution speed and difficulty in strictly handling constraints in existing methods, the present disclosure provides a large-scale electric vehicle cluster coordinated charging optimization method based on greedy repair genetic algorithm. This method ensures that the solution strictly meets complex constraints and offers customized mutation and crossover operators, significantly improving the efficiency of evolution. Thereby, it overcomes the shortcomings of existing methods and achieves the optimization of coordinated charging for large-scale electric vehicle clusters.

SUMMARY

Based on the above purpose, a large-scale electric vehicle cluster coordinated charging optimization method based on greedy repair genetic algorithm is provided by the disclosure.

The large-scale electric vehicle cluster coordinated charging optimization method based on greedy repair genetic algorithm, including following steps:

S1, establishing a task model: establishing a task model of electric vehicle cluster coordinated charging in large charging stations according to the task characteristics of electric vehicle charging;

S2, constructing constraint conditions: constructing constraint conditions for the coordinated charging optimization problem according to principles of guaranteeing stable operation of the power distribution network and meeting the charging requirement of the electric vehicle;

S3, constructing a constrained optimization problem: designing an objective function with the minimum charging cost, performing linear mathematical transformation on non-linear constraint conditions, and constructing a 0/1 integer linear programming problem; and S4, solving the constrained optimization problem: carrying out genetic coding on a decision model of the charging station, and specifically designing a genetic algorithm with greedy repair operators to solve the constructed constrained optimization problem.

Optionally, establishing the task model in the S1 includes following steps:

S11, setting a discrete-time system: adopting a discrete-time system setting, defining a sampling period length as $\Delta_t$, including 5 minutes, 10 minutes, 15 minutes, half an hour and one hour, indexing each time period with a positive integer $t \geq 1$, regarding the basic load, the connection state of the electric vehicle and the charging pile, and the charging power and the electricity price of the electric vehicle as constant values under the discrete-time system setting and in each time period with a length $\Delta_t$;

S12, determining a scheduling interval: starting a scheduling interval for electric vehicle coordinated charging from a current time step t and lasting until the time step t+T;

S13, defining the charging task: defining a charging task $d_v$ for the electric vehicle v when an electric vehicle v enters the garage and is connected to the charging pile, expressed as:

$$d_v = (v, t_v^a, t_v^d, s_v^a, s_v^d, E_v, P_v, \eta_v, i_v, \Phi_v);$$

where $t_v^a$ is the plug-in time when the electric vehicle v arrives at the garage to connect the charging pile and get ready for charging, and $t_v^d$ is the plug-out time of the electric vehicle v; $s_v^a$ is the initial SOC (state of charge) of the battery when the electric vehicle v arrives at the garage, $s_v^d$ is the expected SOC when the electric vehicle v is plugged out; $E_v$ is the battery capacity of the electric vehicle v, $P_v$ is the charging power of the electric vehicle v, $\eta_v \in [0,1]$ is the charging efficiency of the battery of the electric vehicle v, and $i_v$, is the number of the charging pile connected to the electric vehicle v, and $\Phi_v \in \{A, B, C\}$ is the charging load phase of the electric vehicle v;

S14, defining decision variables: defining a decision variable matrix X for V vehicles when V vehicles enter the garage and are connected to the charging piles, expressed as:

$$X = \begin{pmatrix} x_{11} & \cdots & x_{1T} \\ \vdots & \ddots & \vdots \\ x_{V1} & \cdots & x_{VT} \end{pmatrix}_{V \times T} \quad x_{v,t} \in \{0, 1\}, \forall v \in [1, V];$$

where V is the number of rows in the matrix, and T is the number of columns in the matrix, $x_{v,t} \in \{0,1\}$ indicates the on-off state of the charging pile $i_v$ at the time step t; and S15, defining a coordinated charging time domain: defining $T_t$ as a set of time steps included in the finite time domain of coordinated charging from the current time step t, and at time step t, a total of V electric vehicles are connected with charging piles to prepare for charging, recorded as set $V_t$, as follows:

$$T_t = \{t, t+1, \ldots, t+T_t-1\}.$$

Optionally, the constructing the constraint conditions in the S2 includes following steps:

S21, charging task constraints: meeting relevant constraints of the electric vehicle charging task, including charging time constraint and battery SOC constraint; and S22, distribution network stability constraints: meeting relevant constraints of the safe and stable operation of the power distribution network, including each-phase total load constraint and three-phase load balance degree constraint of the distribution transformer.

Optionally, the charging task constraints in the S21 include:

S211, charging time constraint: after the electric vehicle v enters the garage and is connected to the charging pile, when the scheduling time k exceeds the expected plug-out time $t_v^d$ of the electric vehicle v, stopping charging the electric vehicle v, expressed as:

$$x_{v,k} = 0, \forall k \in T_t \text{ and } k > t_v^d, v \in V_t; \text{ and}$$

S212, battery SOC constraint: setting an expected SOC value, calculating a maximum SOC value, and adjusting charging times in an optimization process, specifically including:

S2121, SOC value constraint: after the electric vehicle v enters the garage and is connected to the charging pile, setting the expected SOC value $s_v^d$ by the user, and maintaining the SOC of the electric vehicle v at any time period k below the threshold set by the user, expressed as:

$$s_{v,k} = s_{v,k-1} + x_{v,k} \frac{\eta_v P_v \Delta_t}{E_v}, \forall k \in \mathcal{T}_t;$$

$$s_{v,k} \leq s_v^d, \forall k \in \mathcal{T}_t$$

where $s_{v,k}$ represents the SOC value of the electric vehicle v at the end of the time period k;

S2122, calculating an SOC increment: the SOC value of the electric vehicle v during vehicle lifting is equal to the expected value $s_v^d$ specified by the user, and the SOC value constraint cannot be met under the switching control strategy, then the SOC increment of the battery of the electric vehicle v during charging is expressed as:

$$\Delta_v^{SOC} = \frac{P_v \Delta_t \eta_v}{E_v};$$

S2123, calculating a maximum SOC value: calculating the maximum SOC value not exceeding $s_v^d$ and controlled by a switch, expressed as:

$$h(s_v^d) = s_v^a + \left\lfloor \frac{s_v^d - s_v^a}{\Delta_v^{SOC}} \right\rfloor \Delta_v^{SOC};$$

where $\lfloor \cdot \rfloor$ represents the floor function;

S2124, terminal constraint: defining a terminal constraint of the SOC of the electric vehicle v at the time $t_v^d$, expressed as:

$$s_{v,t_v^d} = h(s_v^d), \text{ if } t + T_t - 1 \geq t_v^d;$$

S2125, determining a target SOC: giving a charging task, where $h(s_v^d)$ is the target SOC, and considering a calculation error of floating-point number, expressed as:

$$s_{v,t_v^d} \geq h(s_v^d), \text{ if } t + T_t - 1 \geq t_v^d;$$

S2126, minimizing the charging cost: defining a target function as a minimum charging cost, and automatically reducing $s_{v,t_v^d}$ to $h(s_v^d)$ by the optimizer when solving the optimal solution;

S2127, handling special cases: if the finite time domain $T_t$ does not contain $t_v^d$ of the electric vehicles with the parking time exceeding $T_t$, calculating the expected SOC of the electric vehicle v in the last time step $t+T_t-1$ of the time domain $T_t$ through the linear interpolation, expressed as:

$$s_{v,t+T_t-1}^d = s_{v,t-1} + \frac{T_t}{t_v^d - t + 1}(s_v^d - s_{v,t-1});$$

S2128, adjusting the terminal constraint: defining the terminal constraint for the finite time domain $T_t$, expressed as:

$$s_{v,t+T_t-1} = h(s_{v,t+T_t-1}^d), \text{ if } t + T_t - 1 \leq t_v^d;$$

$$s_v^a + \sum^k x_{v,k} \Delta_v^{SOC} = s_v^a + \left\lfloor \frac{s_v^d - s_v^a}{\Delta_v^{SOC}} \right\rfloor \Delta_v^{SOC};$$

$$\sum^k x_{v,k} = \left\lfloor \frac{s_v^d - s_v^a}{\Delta_v^{SOC}} \right\rfloor.$$

Optionally, the distribution network stability constraints in S22 include:

S221, each-phase total load constraint: ensuring the total load including basic load and charging load does not exceed the maximum value $P_{max}$ permitted for safe operation of the distribution transformer, expressed as:

$$\sum_{v \in V_t} x_{v,k} P_{v,k} + \sum_{\Phi \in \{A,B,C\}} P_{b,t}^\Phi \leq P_{max}, \forall k \in \mathcal{T}_t;$$

S222, three-phase load balance constraint: maintaining the negative sequence voltage imbalance of the power grid not exceeding 2% during normal operation and not exceeding 4% for short periods, characterizing by calculating a ratio of the maximum difference of three-phase current to the average value of three-phase current, and transforming non-linear constraint into linear constraint, specifically including:

S2221, calculating the each-phase total load: calculating the total load of each phase including basic load and charging load at the time step t, expressed as:

$$P_t^\Phi = P_{b,t}^\Phi + \sum_{v \in V_t^\Phi} x_{v,t} P_{v,t}, \forall \Phi \in \{A, B, C\};$$

where $P_{b,t}^\Phi$ is the basic load of the phase $\Phi$, $V_t^\Phi$ represents the electric vehicle assembly connected to the $\Phi$-phase charging pile;

S2222, calculating a three-phase imbalance: calculating the t-time three-phase imbalance $\psi_t$ by using the load power imbalance, expressed as:

$$\Psi_t = \frac{\max_{\Phi \in \{A,B,C\}} P_t^\Phi - \min_{\Phi \in \{A,B,C\}} P_t^\Phi}{\frac{1}{3} \sum_{\Phi \in \{A,B,C\}} P_t^\Phi};$$

S2223, setting the three-phase imbalance constraint: setting the maximum three-phase imbalance as $\Psi_{max}$ to satisfy the three-phase imbalance $\psi_k \leq \Psi_{max}$, $\forall k \in T_t$ at any time $k \in T_t$:

S2224, transforming into linear constraint: defining the average value of three-phase load at time step t as $$\overline{P} = \frac{1}{3} \sum_{\Phi \in \{A,B,C\}} P_t^\Phi,$$

transforming the non-linear constraint of the three-phase imbalance into a plurality of absolute value constraints by calculating the load difference between every two phases at each time step k, expressed as:

$$\frac{|P_k^A - P_k^B|}{\overline{P}_k} \leq \Psi_{max} \forall k \in T_t;$$

$$\frac{|P_k^B - P_k^C|}{\overline{P}_k} \leq \Psi_{max} \forall k \in T_t;$$

$$\frac{|P_k^C - P_k^A|}{\overline{P}_k} \leq \Psi_{max} \forall k \in T_t;$$

S2225, transforming into a linear equation: transforming an absolute value constraint into a linear constraint, expressed as:

$$-\overline{P}_k \Psi_{max} \leq P_k^A - P_k^B \leq \overline{P}_k \Psi_{max}.$$

Optionally, constructing the objective function and the mathematical transformation in the S3 includes:

S31, designing objective function: where the direct optimization goal of the coordinated charging system is to minimize the users' charging costs, and under the time-of-use electricity pricing mechanism, the charging rates vary in a stepped manner over time; setting the charging unit price charged to the user at the time step t as $\rho_t$ yuan/kWh, expressed as:

$$\rho_t = \rho_t^r + \rho_t^s;$$

where $\rho_t^r$ is the current electricity price (yuan/kWh) under the time-of-use electricity price mechanism and $\rho_t^s$ is the current service cost unit price (yuan/kWh);

S32, calculating the single-time step charging fee: if the electric vehicle $v \in V_t$ is charged in the time step $k \in T_t$ ($x_{v,t}=1$), the cost in the time step k is $\rho_k P_v \Delta_t$.

S33, calculating the total charging cost: in a finite time domain $T_t$, calculating the total charging cost of all electric vehicles, expressed as:

$$f(X) = \Sigma_{k \in T_t} \Sigma_{v \in V_t} x_{v,k} \rho_k P_v \Delta_t;$$

where X represents a set of decision variables;

S34, constructing an optimization problem: summarizing the optimization problem of coordinated charging at the time step t, expressed as:

$$\min_X f(X);$$

subject to:

$$x_{v,k} = 0, \forall k \in T_t \text{ and } k > t_v^d, v \in V_t;$$

$$s_{v,k} = s_{v,k-1} + x_{v,k} \frac{\eta_v P_v \Delta_t}{E_v}, \forall k \in T_t;$$

$$s_{v,k} \leq s_v^d, \forall k \in T_t;$$

$$s_{v,t_v^d} = h(s_v^d), \text{ if } t + T_t - 1 \geq t_v^d;$$

$$s_{v,t+T_t-1} = h(s_{v,t+T_t-1}^d), \text{ if } t + T_t - 1 \leq t_v^d;$$

$$\sum_{v \in V_t} x_{v,k} P_{v,k} + \sum_{\Phi \in \{A,B,C\}} P_{b,t}^\Phi \leq P_{max}, \forall k \in T_t;$$

$$\frac{|P_k^A - P_k^B|}{\overline{P}_k} \leq \psi_{max} \forall k \in T_t;$$

$$\frac{|P_k^B - P_k^C|}{\overline{P}_k} \leq \psi_{max} \forall k \in T_t;$$

$$\frac{|P_k^C - P_k^A|}{\overline{P}_k} \leq \psi_{max} \forall k \in T_t.$$

Optionally, solving the constrained optimization problem in the S4 includes:

S41, initializing the population: when the population $P_0$ is initialized, sequentially generating a decision vector $x_v$ of each electric vehicle according to the $t_v^d$ of each electric vehicle and the matrix K, so as to meet the SOC constraint of the battery (ensuring the number of each row equals K);

S42, calculating population fitness: calculating the population fitness value of the parent population $P_t$;

S43, judging the termination condition: determining whether the termination evolution condition is reached, outputting the optimization result if the termination evolution condition is reached, and continuing execution if the termination evolution condition is not reached;

S44, generating a sub-population: generating the sub-population $Q_t$ through crossover, mutation and repair;

S45, calculating a sub-population fitness: calculating the population fitness value of the sub-population $Q_t$;

S46, elite strategy: adopting the elite strategy to generate $P_{t+1}$; and

S47, the number of iterations: setting t=t+1, where the number of iterations is increased by 1, and returning to judge the termination condition.

Optionally, the initializing the population in the S41 includes:

S411, judging whether the vehicle is the last vehicle or not: judging whether the vehicle is the last electric vehicle or not, if the vehicle is the last electric vehicle, outputting the decision variable X, and if the vehicle is not the last electric vehicle, continuing to execute;

S412, determining a decision vector dimension: determining a dimension $n_v$ of the decision vector $x_v$ of the electric vehicle v according to the time domain $T_t$ and $t_v^d$;

S413, determining charging times: determining the charging times $k_v$ of the electric vehicle v according to the matrix K;

S414, generating a random vector: generating an $n_v$-dimensional random vector $x_v$;

S415, setting a charging period: finding a $k_v$-th large number $x_k$ in $x_v$, setting all values greater than $x_k$ to 0, and all values not greater than $x_k$ to 1; and S416, adding the decision variable set: adding the decision vector $x_v$ to the decision variable X, and returning to judge whether the vehicle is the last vehicle.

Optionally, the repair in S44 includes repairing the each phase total load constraint and repairing the three-phase load balance constraint, where repairing the each phase total load constraint by adopting a Repair_load operation, repairing the moment with the maximum total load each time; and repairing the three-phase load balance degree constraint is operated by adopting a Repair_imbalance operation, and repairing the moment with the maximum balance of the three-phase load each time.

Optionally, the Repair_load operation includes:

finding the maximum load moment: finding the moment with the maximum total load $t_{max}$;

judging whether the load exceeds the limit: judging whether the total load $P_{max}$ of $t_{max}$ is greater than the maximum load upper limit $P_{limit}$ or not, if yes, continuing to execute, and otherwise, outputting the repaired decision variable X;

randomly selecting a charging vehicle: randomly selecting a charged electric vehicle $v_{rand}$ at the moment $t_{max}$;

selecting a time period according to electricity price: selecting a time period $t_{rand}$ from a low to high probability of the electricity price in a decision vector $x_{v_{rand}}$ of the electric vehicle $v_{rand}$; and performing switching operation: performing swap operation on two moments $t_{max}$ and $t_{rand}$ in the decision vector $x_{v_{rand}}$ of the electric vehicle $v_{rand}$, and returning to find the maximum load moment.

The Repair_imbalance operation includes:

finding the maximum balance moment: finding the moment with the maximum three-phase load balance $t_{max}$;

judging whether the balance exceeds the limit: judging whether the three-phase load balance at the moment $t_{max}$ is greater than the upper limit of the maximum three-phase load balance $Imbalance_{limit}$, if yes, continuing to execute, and otherwise, outputting the repaired decision variables X;

determining the maximum and minimum phases: determining a maximum phase $\Phi_{max}$ and a minimum phase $\Phi_{min}$ of the load at the moment $t_{max}$;

randomly selecting vehicles: randomly selecting a charged electric vehicle $v_{max}$ with the maximum phase $\Phi_{max}$ and an uncharged electric vehicle $v_{min}$, with the minimum phase $\Phi_{min}$ and adhering to the maximum load limit after charging at time $t_{max}$;

selecting a time period according to electricity price: selecting a moment $t_{maxrand}$ where an uncharged electric vehicle maintains the maximum load limit after charging according to a low to high probability of the electricity price in a decision vector $x_{v_{max}}$ of the electric vehicle $v_{max}$;

selecting a charging time period: selecting a charging time $t_{minrand}$ in a decision vector $x_{v_{min}}$ of the electric vehicle $v_{min}$ according to a high to low probability of the electricity price;

judging the time period and the vehicle: judging whether a required $t_{maxrand}$ and the electric vehicle $v_{min}$ exist or not, if not, outputting an unrepaired decision variables, and if yes, continuing to execute;

swapping the maximum vehicle: performing swap operation on two moments $t_{max}$ and $t_{maxrand}$ in the decision vector $x_{v_{max}}$ of the electric vehicle $v_{max}$; and exchanging the minimum vehicle: performing swap operation on two moments $t_{max}$ and $t_{minrand}$ in the decision vector $x_{v_{min}}$ of the electric vehicle $v_{min}$, and returning to find the maximum balance moment.

The disclosure has the following beneficial effects.

According to the disclosure, comprehensive analysis and modeling are carried out on a large-scale electric vehicle charging model (including an electric vehicle charging task and a power grid stable operation), and a user charging cost minimization problem is established. According to the large-scale electric vehicle cluster coordinated charging optimization method based on greedy repair genetic algorithm, the charging cost problem of the user is solved, the charging constraint problem is solved, and the performance of the whole charging station is improved.

According to the disclosure, by developing the large-scale electric vehicle cluster coordinated charging optimization method based on greedy repair genetic algorithm, the charging cost of the user can be effectively reduced, and stable operation of the power grid can be ensured.

According to the disclosure, the population initialization algorithm, the greedy repair operators Repair_load and Repair_imbalance are designed to ensure that the population meets the constraint of the electric vehicle charging task and the stable operation of the power grid in the evolutionary iteration process, and the effectiveness and advancement of the method in the aspect of large-scale charging decision of the electric vehicle are displayed.

BRIEF DESCRIPTION OF THE DRAWINGS

In order to more clearly illustrate the technical solutions of the present disclosure or the prior art, the drawings required in the description of the embodiments or the prior art are briefly described below. It is obvious that the drawings in the following description are merely the present disclosure, and other drawings can be obtained by a person of ordinary skill in the art according to these drawings without creative efforts.

DETAILED DESCRIPTION OF THE EMBODIMENTS

Figure 1:
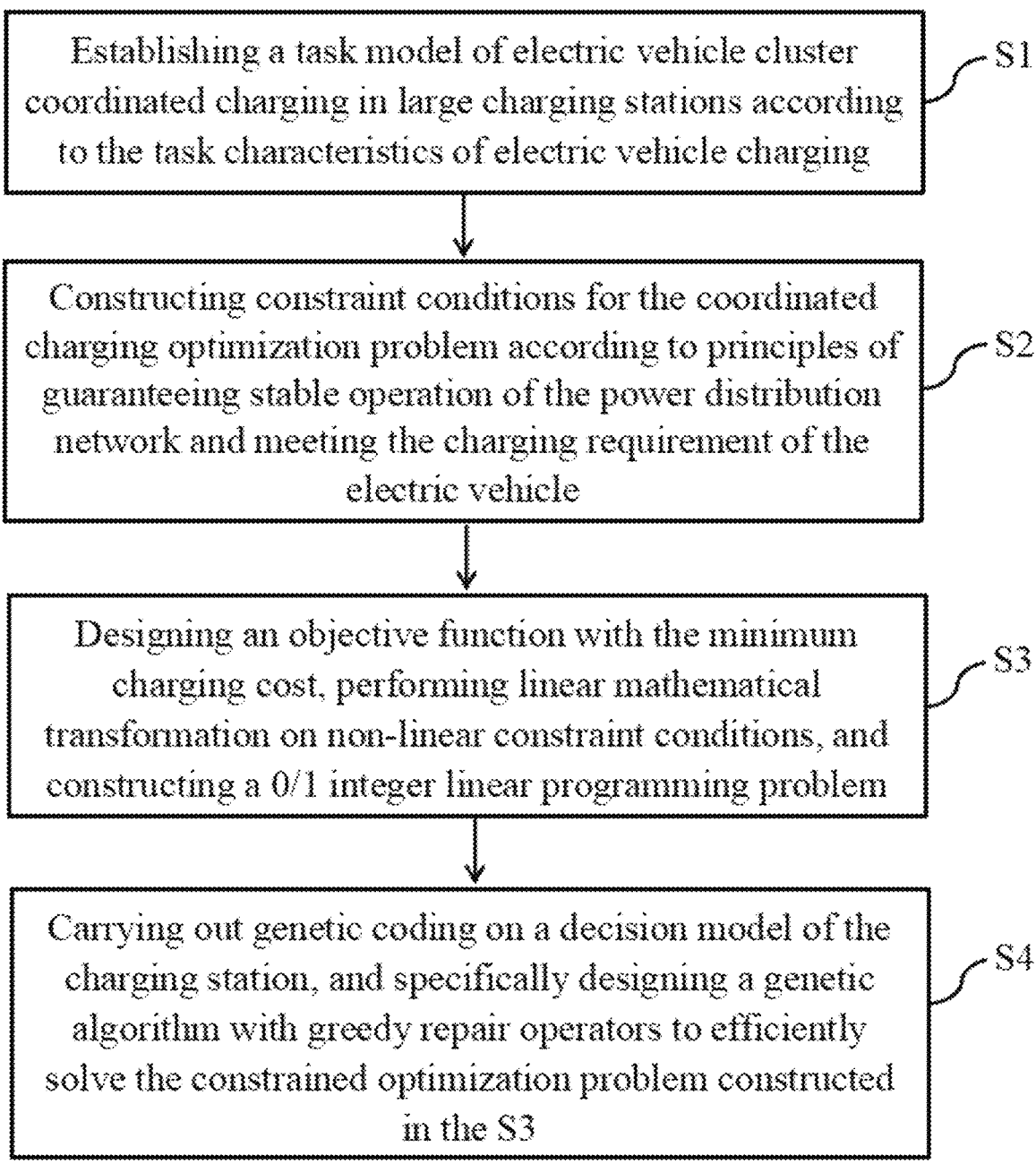
FIG. 1 is a schematic flow diagram of an optimization method according to an embodiment of the present disclosure.

The present disclosure is described in detail below with reference to the accompanying drawings and specific embodiments. In order to make the embodiments more detailed, the following embodiments are the most preferred and preferred embodiments, and those skilled in the art can also use other alternatives to implement some well-known techniques; and the drawings are only for more specific description of the embodiments, and are not intended to specifically limit the present disclosure.

It should be noted that references to "one embodiment", "an embodiment", "an exemplary embodiment", "some embodiments", etc. in the specification indicate that the embodiment may include a particular feature, structure, or characteristic, but not necessarily every embodiment includes the particular feature, structure, or characteristic. In addition, when a particular feature, structure, or characteristic is described in connection with an embodiment, such a feature, structure, or characteristic may be implemented within a knowledge range of a person skilled in the relevant art in conjunction with other embodiments (whether explicitly described or not).

In general, the terms may be understood, at least in part, from the use in the context. For example, the term "one or more" as used herein may be used to describe any feature, structure, or characteristic of a singular sense, or may be used to describe a combination of features, structures, or characteristics in a plural sense, depending at least in part on the context. In addition, the term "based on" may be understood as not necessarily intended to convey an exclusive set of factors, but may instead, depending at least in part on the context, allow for other factors not necessarily explicitly described.

As shown in FIG. 1-FIG. 5, a large-scale electric vehicle cluster coordinated charging optimization method based on greedy repair genetic algorithm includes the following steps:

S1, establishing a task model of electric vehicle cluster coordinated charging in large charging stations according to the task characteristics of electric vehicle charging, details are as follows:

adopting a standard discrete-time system setting, where the sampling period length is $\Delta_t$, and common values include 5 minutes, 10 minutes, 15 minutes, half an hour and one hour; indexing each time period with a positive integer t≥1, regarding the basic load, the connection state of the electric vehicle and the charging pile, and the charging power and the electricity price of the electric vehicle as constant values under the discrete-time system setting and in each time period with a length $\Delta_t$; starting a scheduling interval for electric vehicle coordinated charging from a current time step t, including next T time periods. T may be a fixed value, typically a large enough constant value (such as one day);

when an electric vehicle v enters the garage and is connected to the charging pile, defining a charging task $d_v$ including ten elements for the electric vehicle as follows:

$$d_v = (v, t_v^a, t_v^d, s_v^a, s_v^d, E_v, P_v, \eta_v, i_v, \Phi_v) \qquad (1)$$

$t_v^a$ is the plug-in time when the vehicle arrives at the garage to connect the charging pile and get ready for charging, and $t_v^d$ is the plug-out time of the vehicle; $s_v^a$ is the initial SOC (state of charge) of the battery when the vehicle arrives at the garage, $s_v^d$ is the expected SOC when the vehicle is plugged out, and it is required $0 \leq s_v^d \leq 1$; $E_v$ is the battery capacity of the vehicle, $P_v$ is the charging power of the vehicle, $\eta_v \in [0,1]$ is the charging efficiency of the battery of the vehicle, and $i_v$ is the number of the charging pile connected to the electric vehicle v, and $\Phi_v \in \{A, B, C\}$ is the charging load phase of the electric vehicle v, and is determined by the charging pile $i_v$ used thereby;

defining a decision variable matrix X including V rows and T columns for V vehicles when V vehicles enter the garage and are connected to the charging piles:

$$X = \begin{pmatrix} x_{11} & \cdots & x_{1T} \\ \vdots & \ddots & \vdots \\ x_{V1} & \cdots & x_{VT} \end{pmatrix}_{V \times T} \quad x_{v,t} \in \{0,1\}, \forall v \in [1, V] \qquad (2)$$

The available Boolean variable $x_{V,t} \in \{0,1\}$ represents the on-off state of the charging pile $i_v$ in the time step t: $x_{v,t}=1$ represents that the electric vehicle v is charged in the time step t, and $x_{v,t}=0$ represents that the electric vehicle v is not charged.

defining $T_t$ as a set of time steps included in the finite time domain of coordinated charging from the current time step t, $$T_t = \{t, t+1, \ldots, t+T_t-1\} \qquad (3)$$

S2, constructing constraint conditions for the coordinated charging optimization problem according to principles of guaranteeing stable operation of the power distribution network and meeting the charging requirement of the electric vehicle, details are as follows:

In order to meet the related constraints of the electric vehicle charging task, the charging time constraint and the battery SOC constraint are mainly achieved.

The charging time constraint requires that when the electric vehicle v enters the garage and is connected to the charging pile, the scheduling time T may exceed the expected plug-out time $t_v^d$ of the electric vehicle v. When the time exceeds $t_v^d$, stop charging the electric vehicle v, that is:

$$x_{v,k}=0, \forall k \in T_t \text{ and } k > t_v^d, v \in V_t \qquad (4)$$

The battery SOC constraint requires that when the electric vehicle v enters the garage and is connected to the charging pile, the user sets the expected SOC value $s_v^d$. The SOC of the electric vehicle v at any time period k cannot exceed the expected value set by the user, that is:

$$s_{v,k} = s_{v,k-1} + x_{v,k} \frac{\eta_v P_v \Delta_t}{E_v}, \forall k \in \mathcal{T}_t \qquad (5)$$

$$s_{v,k} \leq s_v^d, \forall k \in \mathcal{T}_t \qquad (6)$$

where $s_{v,k}$ represents the SOC value of the electric vehicle v at the end of the time period k;

The charging task $d_v$ is given in Equation (1), theoretically, the SOC of the electric vehicle v during vehicle lifting should be equal to the expected value specified by the user. However, under the switch control strategy, it can be known from Equation (5) that $s_{v,k}$ can only take one of finite discrete values, and the equation constraint cannot be met. If the battery of the electric vehicle is charged at a certain time step, the SOC increment in the time period is:

$$\Delta_v^{SOC} = \frac{P_v \Delta_t \eta_v}{E_v} \qquad (7)$$

In order to solve the optimization problem, firstly, the maximum SOC value which does not exceed $s_v^d$ and can be realized by switch control is obtained as follows:

$$h(s_v^d) = s_v^a + \left\lfloor \frac{s_v^d - s_v^a}{\Delta_v^{SOC}} \right\rfloor \Delta_v^{SOC} \qquad (8)$$

where $\lfloor r \rfloor$ represents a floor function and returns a maximum integer not greater than a real number.

The terminal constraint of the electric vehicle v SOC at time $t_v^d$ is as follows:

$$s_{v,t_v^d} = h(s_v^d), \text{ if } t + T_c - 1 \geq t_v^d \qquad (9)$$

It is worth pointing out that for a given charging task $d_v$, $h(s_v^d)$ is a constant value, which may be referred to as a "target SOC". In actual code writing, considering the calculation error of floating-point numbers, the "=" in Equation (9) can be changed to "≥". Since the objective function is the minimization of charging cost, the optimizer automatically reduces $$s_{v,t_v^d} \text{ to } h(s_v^d)$$

in Equation (9) when solving the optimal solution.

As shown in Equation (3), under special circumstances, the finite time domain $T_t$ may not include a small number of electric vehicles $t_v^d$ with very long parking time. In this case, the expected SOC of the car in the last time step in the time domain can be approximately set as: the expected SOC of the vehicle v in the last time step $(t+T_t-1)$ in the time domain $T_t$ can be approximately set in a linear interpolation mode:

$$s_{v,t+T_t-1}^d = s_{v,t-1} + \frac{T_t}{t_v^d - t + 1}(s_v^d - s_{v,t-1}) \qquad (10)$$

then, the terminal constraint for the finite time domain $T_t$ is obtained as follows:

$$s_{v,t+T_t-1} = h(s_{v,t+T_t-1}^d), \text{ if } t + T_t - 1 \leq t_v^d \qquad (11)$$

according to Equation (9):

$$s_v^a + \sum^k x_{v,k}\Delta_v^{SOC} = s_v^a + \left\lfloor \frac{s_v^d - s_v^a}{\Delta_v^{SOC}} \right\rfloor \Delta_v^{SOC} \qquad (12)$$

that is:

$$\sum^k x_{v,k} = \left\lfloor \frac{s_v^d - s_v^a}{\Delta_v^{SOC}} \right\rfloor \qquad (13)$$

According to Equation (13), the charging times of each vehicle in a finite time domain $T_t$ are fixed.

In order to meet the related constraints of the safe and stable operation of the distribution network, there are mainly the each-phase total load constraint of the distribution transformer and the three-phase load balance constraint.

The each-phase total load constraint requires that the total load, including basic load and charging load, should not exceed the maximum allowable value $P_{max}$ for safe operation of the distribution transformer, expressed as:

$$\sum_{v \in V_t} x_{v,k} P_{v,k} + \sum_{\phi \in \{A,B,C\}} P_{b,t}^\phi \leq P_{max} \forall k \in \mathcal{T}_t \qquad (14)$$

The three-phase load balance constraint requires that the negative sequence voltage imbalance should not exceed 2% during normal operation and 4% for short periods. According to the method of calculating three-phase voltage imbalance according to IEEESTD936-1987 standard, the three-phase imbalance is characterized by the ratio of the maximum difference of three-phase current to the average value of three-phase current.

First, calculating the total load of each phase including basic load and charging load at the time step t:

$$P_c^\phi = P_{b,t}^\phi + \sum_{v \in V_t^\phi} x_{v,t} P_{v,t}, \forall \Phi \in \{A, B, C\} \qquad (15)$$

where $P_{b,t}^\Phi$ is the basic load of the phase $\Phi$, $V_t^\Phi$ represents the electric vehicle assembly connected to the $\Phi$-phase charging pile;

then, calculating the t-time three-phase imbalance $\psi_t$ by using the load power imbalance, the equation is expressed as follows:

$$\Psi_t = \frac{\max_{\phi \in \{A,B,C\}} P_t^\phi - \min_{\phi \in \{A,B,C\}} P_t^\phi}{\frac{1}{3}\sum_{\phi \in \{A,B,C\}} P_t^\phi}. \qquad (16)$$

In the Equation (16), the numerator represents the maximum difference of three-phase load, and the denominator represents the average value of three-phase load. Setting the three-phase imbalance constraint: setting the maximum three-phase imbalance as $\Psi_{max}$ to satisfy the three-phase imbalance $\psi_k \leq \Psi_{max}$, $\forall k \in T_t$ at any time $k \in T_t$:

$$\psi_k \leq \Psi_{max}, \forall k \in T_t \qquad (17).$$

The constraint original form consisting of Equation (16) and Equation (17) is non-linear (including max and min operators), is difficult to process in the optimization problem, and increases the calculation time. Defining the average value of three-phase load at time step t as $$\bar{P} = \frac{1}{3}\sum_{\phi \in \{A,B,C\}} P_t^\phi,$$

transforming the non-linear constraint (17) of the three-phase imbalance into a plurality of absolute value constraints by calculating the load difference between every two phases at each time step k, expressed as follows:

$$\frac{|P_k^A - P_k^B|}{\bar{P}_k} \leq \psi_{max} \forall k \in \mathcal{T}_t \qquad (18a)$$

$$\frac{|P_k^B - P_k^C|}{\bar{P}_k} \leq \psi_{max} \forall k \in \mathcal{T}_t \qquad (18b)$$

$$\frac{|P_k^C - P_k^A|}{\bar{P}_k} \leq \psi_{max} \forall k \in \mathcal{T}_t. \qquad (18c)$$

The constraints containing the absolute values in the Equation (18a), Equation (18b) and Equation (18c), can be easily converted into linear constraints. Taking Equation (18a) as an example, the corresponding linear constraint is:

$$-\overline{P}_k \Psi_{max} \leq P_k^A - P_k^B \leq \overline{P}_k \Psi_{max}.$$

S3, designing an objective function with the minimum charging cost, performing linear mathematical transformation on non-linear constraint conditions, and constructing a 0/1 integer linear programming problem, as follows:

the direct optimization goal of coordinated charging system is to minimize the user's charging cost;

under the time-of-use electricity pricing mechanism, the charging rates vary in a stepped manner over time; setting the charging unit price charged to the user at the time step t as $\rho_t$ yuan/kWh, expressed as:

$$\rho_t = \rho_t^r + \rho_t^s \tag{19}$$

where $\rho_t^r$ is the current electricity price (yuan/kWh) under the time-of-use electricity price mechanism and $\rho_t^s$ is the current service cost unit price (yuan/kWh);

if the electric vehicle $v \in V_t$ is charged in the time step $k \in T_t$ ($x_{v,t} = 1$), the cost in this time step is $\rho_k P_v \Delta_t$, and in a finite time domain $T_t$, the total charging cost of all electric vehicles is expressed as:

$$f(X) = \Sigma_{k \in T_t} \Sigma_{v \in V_t} x_{v,k} \rho_k P_v \Delta_t \tag{20}$$

where X represents a set of decision variables and represents the on-off state of each electric vehicle at each time step.

summarizing the optimization problem of coordinated charging at the time step t according to the objective functions and the various constraints, as follows:

$$\min_x f(X) \tag{21a}$$

subject to (4),(6),(9),(11),(5),(14),(18)  (21b)

Figure 2:
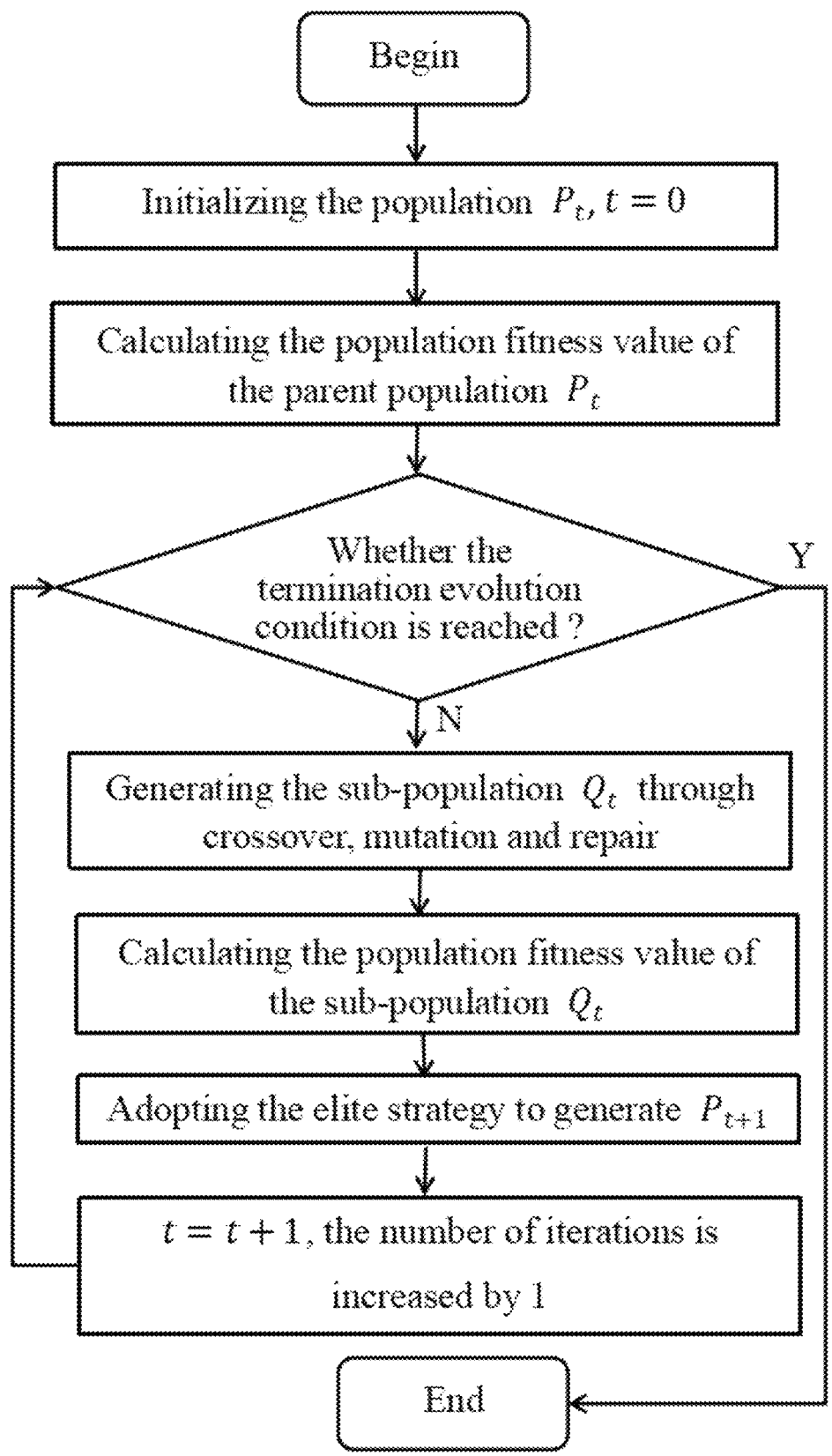
FIG. 2 is a program flow diagram of the iterative process of the genetic algorithm according to the embodiment of the present disclosure.
Figure 3:
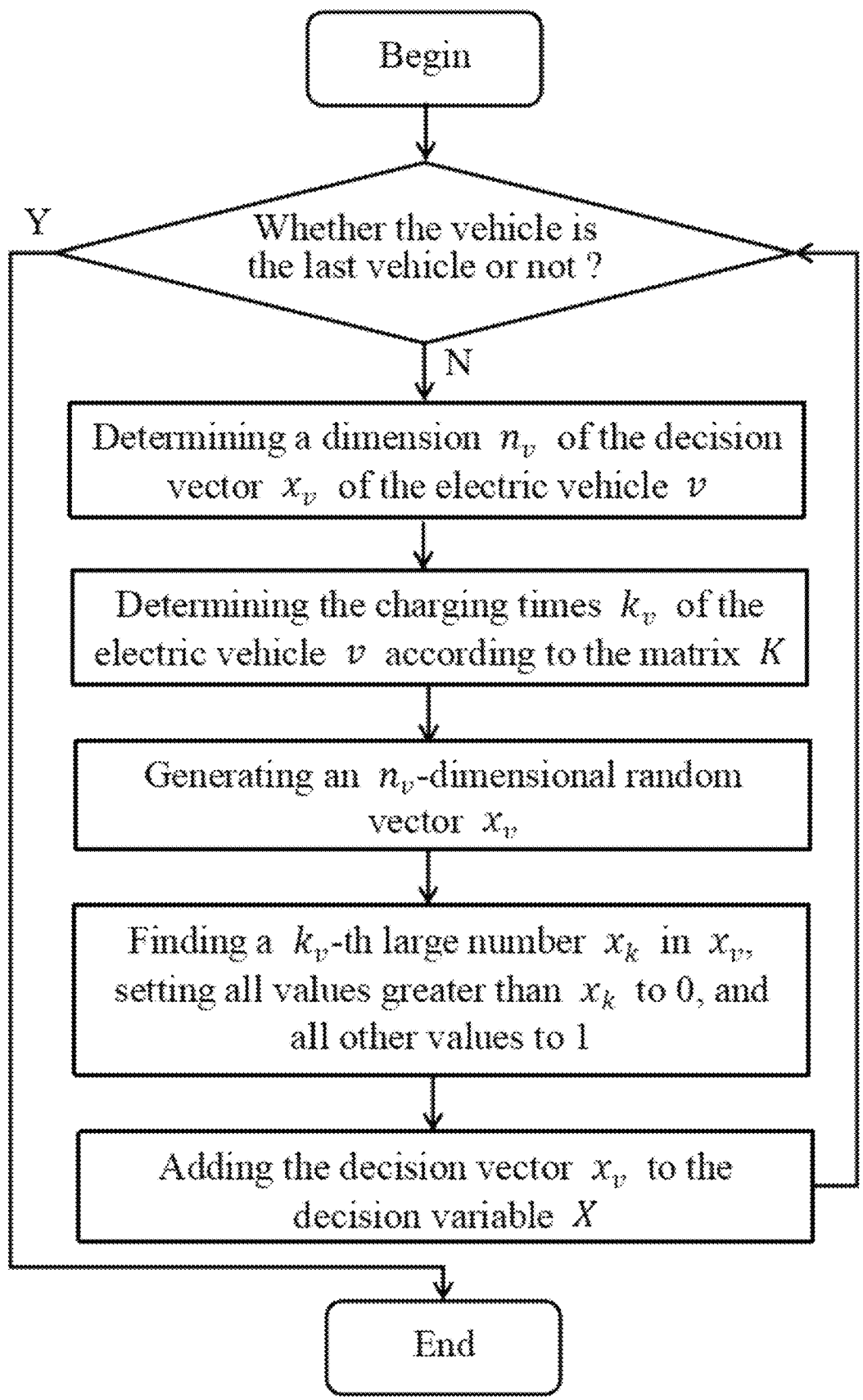
FIG. 3 is a program flow diagram of population initialization of the genetic algorithm according to the embodiment of the present disclosure.

S4, carrying out genetic coding on a decision model of the charging station, and specifically designing a genetic algorithm with greedy repair operators to efficiently solve the constrained optimization problem constructed in S3, as shown in FIG. 2, the iterative process of the genetic algorithm includes the following steps:

S4.1, initializing the population $P_t$, t=0;

when the population $P_0$ is initialized, sequentially generating a decision vector $x_v$ of each vehicle according to the $t_v^d$ of each vehicle and the matrix K, ensuring the number of each row equals K, so as to meet the SOC constraint of the battery. As shown in FIG. 3, the population initialization includes the following steps:

S4.1.1, judging whether the vehicle is the last vehicle or not: if the vehicle is the last vehicle, outputting the decision variable X, and if the vehicle is not the last vehicle, proceeding to the next step;

S4.1.2, determining a dimension $n_v$ of the decision vector $x_v$ of the vehicle v according to the time domain $T_t$ and $t_v^d$;

S4.1.3, determining the charging times $k_v$ of the vehicle v according to the matrix K;

S4.1.4, generating an $n_v$-dimensional random vector $x_v$;

S4.1.5, finding a $k_v$-th large number $x_k$ in $x_v$, setting all values greater than $x_k$ to 0, and all the others not greater than $x_k$ to 1; and S4.1.6, adding the decision vector $x_v$ to the decision variable X, and returning to S4.1.1.

S4.2, calculating the population fitness value of the parent population $P_t$;

S4.3, determining whether the termination evolution condition is reached, outputting the optimization result if the termination evolution condition is reached, and proceeding to the next step if it is not;

S4.4, generating the sub-population $Q_t$ through crossover, mutation and repair;

S4.5, calculating the population fitness value of the sub-population $Q_t$;

S4.6, adopting the elite strategy to generate $P_{t+1}$;

S4.7, t=t+1, adding 1 to the number of iterations, and returning to S4.3.

It is necessary to repair a newly generated individual that does not satisfy the constraint, so that the individual becomes a feasible solution, specifically as follows:

For the decision variable X, namely special processing of individuals in the population, the condition that the charging time constraint and the battery SOC constraint are not met does not exist, and only each-phase total load constraint and three-phase load balance constraint need to be considered and repaired.

The non-feasible solution that does not meet the constraints is repaired twice, and the Repair_load and Repair_imbalance operations make the non-feasible solution that does not meet the constraints become feasible.

Figure 4:
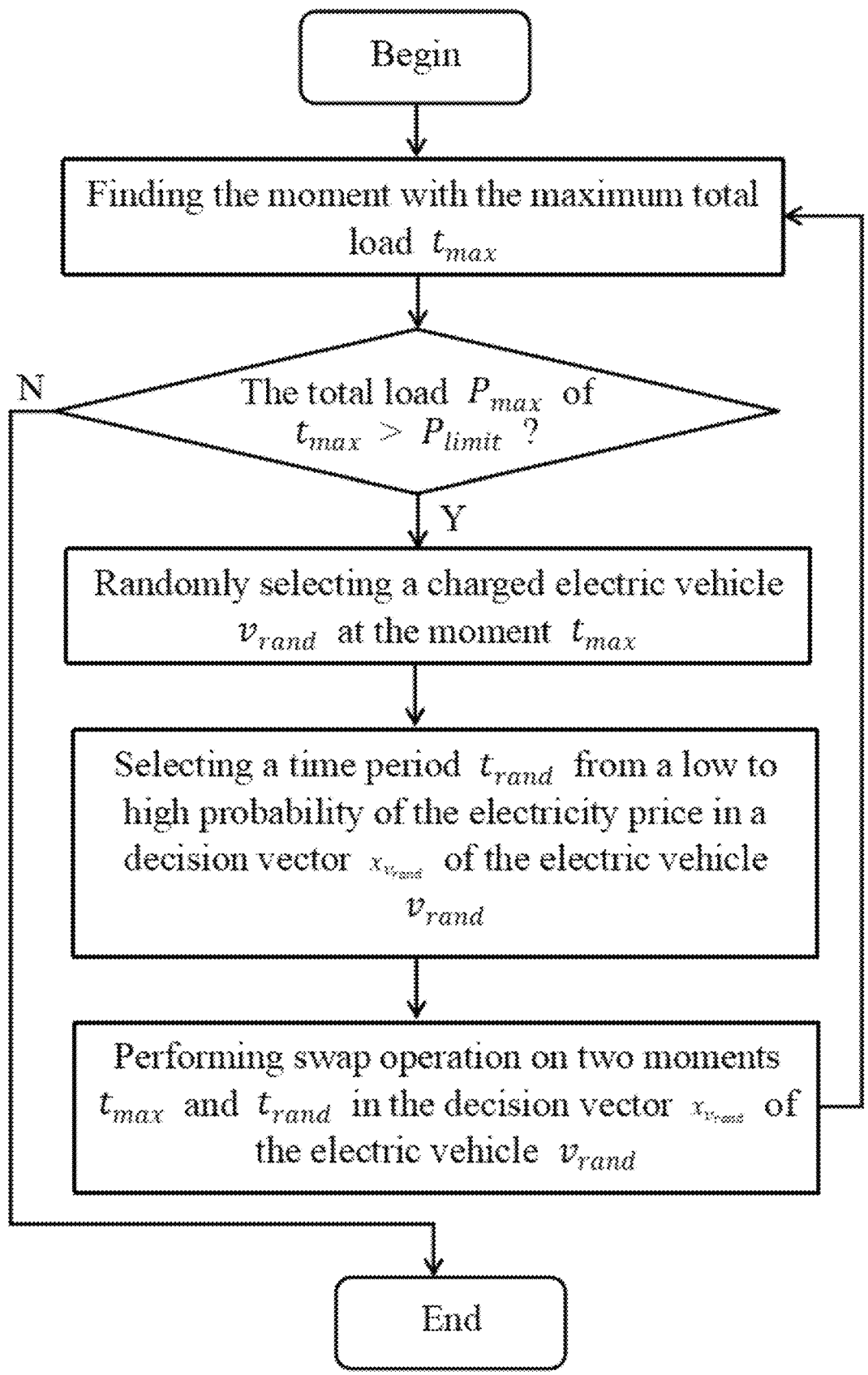
FIG. 4 is a program flow diagram of a greedy repair operator Repair_load according to the embodiment of the present disclosure.

Repairing each phase total load constraint by adopting the Repair_load operation, repairing the moment with the maximum total load each time, as shown in FIG. 4. Repair_load includes the following steps:

S4.4.1.1, finding the moment with the maximum total load $t_{max}$;

S4.4.1.2, judging whether the total load $P_{max}$ of $t_{max}$ is greater than the maximum load upper limit $P_{limit}$ or not, if yes, proceeding to the next step, and otherwise, outputting the repaired decision variable X;

S4.4.1.3, randomly selecting a charged vehicle $v_{rand}$ at the moment $t_{max}$;

S4.4.1.4, selecting a time period $t_{rand}$ from a low to high probability of the electricity price in a decision vector $x_{v_{rand}}$ of the vehicle $v_{rand}$;

S4.4.1.5, performing swap operation on two moments $t_{max}$ and $t_{rand}$ din the decision vector $x_{v_{rand}}$ of the vehicle $v_{rand}$, and returning to S4.4.1.1.

Figure 5:
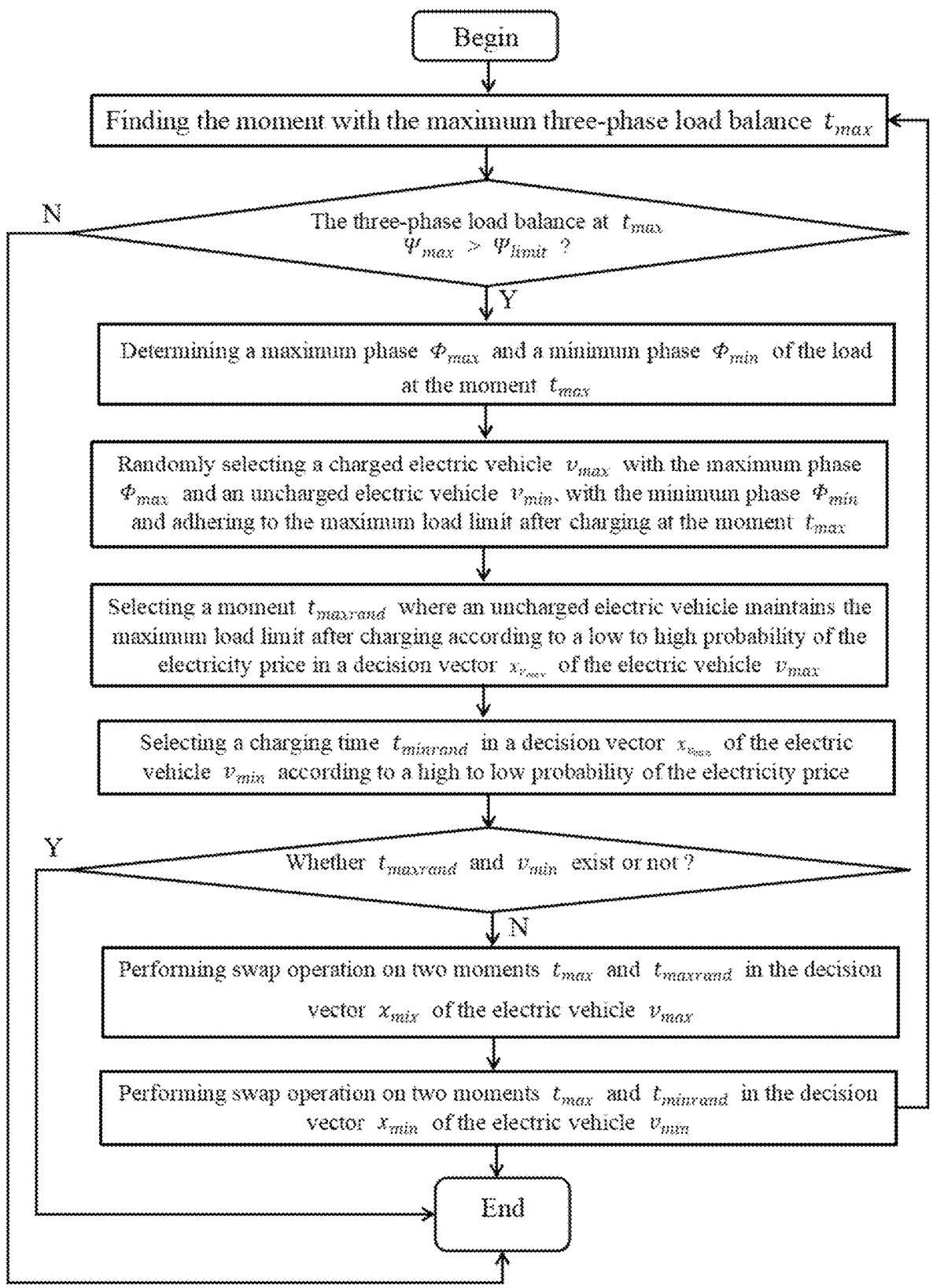
FIG. 5 is a program flow diagram of a greedy repair operator Repair_imbalance according to the embodiment of the present disclosure.

Repairing the three-phase load balance degree constraint is operated by adopting a Repair_imbalance operation, and repairing the moment with the maximum balance of the three-phase load each time, as shown in FIG. 5. Repair_imbalnace includes the following steps:

S4.4.2.1, finding the moment with the maximum three-phase load balance $t_{max}$;

S4.4.2.2, judging whether the balance exceeds the limit: judging whether the three-phase load balance at the moment $t_{max}$ is greater than the upper limit of the maximum three-phase load balance Imbalance$_{limit}$, if yes, proceeding to the next step, and otherwise, outputting the repaired decision variables X;

S4.4.2.3, determining a maximum phase $\Phi_{max}$ and a minimum phase $\Phi_{min}$ of the load at the moment $t_{max}$;

S4.4.2.4, randomly selecting a charged vehicle $v_{max}$ with the maximum phase $\Phi_{max}$ and an uncharged vehicle $v_{min}$ with the minimum phase $\Phi_{min}$ and adhering to the maximum load limit after charging at time $t_{max}$;

S4.4.2.5, selecting a moment $t_{maxrand}$ where an uncharged vehicle maintains the maximum load limit after charging according to a low to high probability of the electricity price in a decision vector $x_{v_{max}}$ of the vehicle $v_{max}$;

S4.4.2.6, selecting a charging time $t_{minrand}$ in a decision vector $x_{v_{min}}$ of the vehicle $v_{min}$ according to a high to low probability of the electricity price;

S4.4.2.7, judging whether a required $t_{maxrand}$ and the vehicle $v_{min}$ exist or not, if not, outputting an unrepaired decision variables, and if yes, proceeding to the next step;

S4.4.2.8, performing swap operation on two moments $t_{max}$ and $t_{maxrand}$ in the decision vector $x_{v_{max}}$ of the vehicle $v_{max}$;

S4.4.2.9, performing swap operation on two moments $t_{max}$ and $t_{minrand}$ in the decision vector $x_{v_{min}}$ of the vehicle $v_{min}$, and returning to S4.4.2.1.

The disclosure covers any substitution, modification, equivalent method and scheme within the spirit and scope of the disclosure. In order to make the public have a thorough understanding of the present disclosure, specific details are described in the following preferred embodiments of the present disclosure, and those skilled in the art can fully understand the present disclosure without the description of these details. In addition, in order to avoid unnecessarily confusing the essence of the present disclosure, well-known methods, procedures, flows, components and circuits have not been described in detail.

The above is only the optional embodiment of the present disclosure, and it should be pointed out that a person skilled in the art can make several improvements and embellishments without departing from the principle of the present disclosure, and these improvements and embellishments should also be regarded as the protection scope of the present disclosure.

What is claimed is:

1. A large-scale electric vehicle cluster coordinated charging optimization method based on greedy repair genetic algorithm, comprising the following steps:

S1, establishing a task model: establishing a task model of electric vehicle cluster coordinated charging in large charging stations according to task characteristics of electric vehicle charging; specifically comprising:

S11, setting a discrete-time system: adopting a discrete-time system setting, defining a sampling period length as $\Delta_t$, comprising 5 minutes, 10 minutes, 15 minutes, half an hour and one hour, indexing each time period with a positive integer $t \geq 1$, regarding a basic load, a connection state of an electric vehicle and a charging pile, and a charging power and an electricity price of the electric vehicle as constant values under the discrete-time system setting and in each time period with a length $\Delta_t$;

S12, determining a scheduling interval: starting a scheduling interval for electric vehicle coordinated charging from a current time step t and lasting until a time step t+T;

S13, defining a charging task: defining a charging task $d_v$ for the electric vehicle v when the electric vehicle v enters a garage and is connected to the charging pile, expressed as:

$d_v = (v, t_v^a, t_v^d, s_v^a, s_v^d, E_v, P_v, \eta_v, i_v, \Phi_v)$;

wherein $t_v^a$ is a plug-in time when the electric vehicle v arrives at the garage to connect the charging pile and get ready for charging, and $t_v^d$ is a plug-out time of the electric vehicle v; $s_v^a$ is an initial SOC of a battery when the electric vehicle v arrives at the garage, $s_v^d$ is an expected SOC when the electric vehicle v is plugged out; $E_v$ is a battery capacity of the electric vehicle v, $P_v$ is the charging power of the electric vehicle v, $\eta_v \in [0,1]$ is a charging efficiency of the battery of the electric vehicle v, and $i_v$ is the number of the charging pile connected to the electric vehicle v, and $\Phi_v \in \{A, B, C\}$ is a charging load phase of the electric vehicle v;

S14, defining decision variables: defining a decision variable matrix X for V vehicles when the V vehicles enter the garage and are connected to charging piles, expressed as:

$$X = \begin{pmatrix} x_{11} & \cdots & x_{1T} \\ \vdots & \ddots & \vdots \\ x_{V1} & \cdots & x_{VT} \end{pmatrix}_{V \times T} \quad x_{v,t} \in \{0, 1\};$$

wherein V is the number of rows in the decision variable matrix X, and T is the number of columns in the decision variable matrix X, $x_{v,t} \in \{0,1\}$ indicates an on-off state of the charging pile $i_v$ at the current time step t; and S15, defining a coordinated charging time domain: defining $T_t$ as a set of time steps comprised in a finite time domain of coordinated charging from the current time step t, expressed as:

$T_t = \{t, t+1, \ldots, t+T_t-1\}$

S2, constructing constraint conditions: constructing constraint conditions for a coordinated charging optimization problem according to principles of guaranteeing stable operation of a power distribution network and meeting a charging requirement of the electric vehicle, wherein the constructing the constraint conditions in the S2 comprises:

S21, charging task constraints: meeting relevant constraints of a electric vehicle charging task, comprising a charging time constraint and a battery state of charge (SOC) constraint; and S22, distribution network stability constraints: meeting relevant constraints of a safe and stable operation of the power distribution network, comprising an each-phase total load constraint and a three-phase load balance degree constraint of a distribution transformer;

S3, constructing a constrained optimization problem: designing an objective function with a minimum charging cost, performing linear mathematical transformation on non-linear constraint conditions, and constructing a 0/1 integer linear programming problem;

S4, solving the constrained optimization problem: carrying out genetic coding on a decision model of a charging station to obtain a coded decision model of the charging station, and specifically designing a genetic algorithm with greedy repair operators to solve the constructed constrained optimization problem; and S5, controlling, based on the constraint conditions for the coordinated charging optimization problem and the coded decision model of the charging station, the charging station to charge for a target electric vehicle cluster, thereby reasonably scheduling a charging time and an order of the target electric vehicle cluster and improving performance of the charging station.

2. The large-scale electric vehicle cluster coordinated charging optimization method based on greedy repair genetic algorithm according to claim 1, wherein the charging task constraints in the S21 comprise:

S211, charging time constraint: after the electric vehicle v enters the garage and is connected to the charging pile, when the scheduling time T exceeds the expected plug-out time $t_v^d$ of the electric vehicle v, stopping charging the electric vehicle v, expressed as:

$$x_{v,k}=0, \forall k \in T_t \text{ and } k>t_v^d, v \in V_t; \text{ and}$$

S212, battery SOC constraint: setting an expected SOC value, calculating a maximum SOC value, and adjusting charging times in an optimization process, specifically comprising:

S2121, SOC value constraint: after the electric vehicle v enters the garage and is connected to the charging pile, setting the expected SOC value $s_v^d$ by the user, and maintaining the SOC of the electric vehicle v at any time period k below the threshold set by the user, expressed as:

$$s_{v,k} = s_{v,k-1} + x_{v,k}\frac{\eta_v P_v \Delta_t}{E_v}, \forall k \in T_t;$$

$$s_{v,k} \le s_v^d, \forall k \in T_t;$$

wherein $s_{v,k}$ represents the SOC value of the electric vehicle v at the end of the time period k;

S2122, calculating an SOC increment: the SOC value of the electric vehicle v during vehicle lifting is equal to the expected value $s_v^d$ specified by the user, and the SOC value constraint cannot be met under the switching control strategy, then the SOC increment of the battery of the electric vehicle v during charging is expressed as:

$$\Delta_v^{SOC} = \frac{P_v \Delta_t \eta_v}{E_v};$$

S2123, calculating a maximum SOC value: calculating the maximum SOC value not exceeding $s_v^d$ and controlled by a switch, expressed as:

$$h(s_v^d) = s_v^a + \left\lfloor \frac{s_v^d - s_v^a}{\Delta_v^{SOC}} \right\rfloor \Delta_v^{SOC};$$

wherein $\lfloor \cdot \rfloor$ represents the floor function;

S2124, terminal constraint: defining a terminal constraint of the SOC of the electric vehicle v at the time $t_v^d$, expressed as:

$$s_{v,t_v^d} = h(s_v^{(i)}), \text{ if } t + T_t - 1 \ge t_v^d;$$

S2125, determining a target SOC: giving a charging task, wherein $h(s_v^d)$ is the target SOC, and considering a calculation error of floating-point number, expressed as:

$$s_{v,t_v^d} \ge h(s_v^d), \text{ if } t + T_t - 1 \ge t_v^d;$$

S2126, minimizing the charging cost: defining a target function as the minimum charging cost, and automatically reducing $s_{v,t_v^d}$ to $h(s_v^d)$ by the optimizer when solving the optimal solution;

S2127, handling special cases: if the finite time domain $T_t$ does not contain $t_v^d$ of the electric vehicles with the parking time exceeding $T_t$, calculating the expected SOC of the electric vehicle v in the last time step $t+T_t-1$ of the time domain $T_t$ through the linear interpolation, expressed as:

$$s_{v,t+T_t-1}^d = s_{v,t-1} + \frac{T_t}{t_v^d - t + 1}(s_v^d - s_{v,t-1});$$

S2128, adjusting the terminal constraint: defining the terminal constraint for the finite time domain $T_t$, expressed as:

$$s_{v,t+T_t-1} = h(s_{v,t+T_t-1}^d), \text{ if } t + T_t - 1 \le t_v^d;$$

$$s_v^a + \sum^k x_{v,k}\Delta^{SOC} = s_v^a + \left\lfloor \frac{s_v^d - s_v^a}{\Delta_v^{SOC}} \right\rfloor \Delta_v^{SOC};$$

$$\sum^k x_{v,k} = \left\lfloor \frac{s_v^d - s_v^a}{\Delta_v^{SOC}} \right\rfloor.$$

3. The large-scale electric vehicle cluster coordinated charging optimization method based on greedy repair genetic algorithm according to claim 2, wherein the distribution network stability constraints in S22 comprise:

S221, each-phase total load constraint: ensuring the total load comprising basic load and charging load does not exceed the maximum value $P_{max}$ permitted for safe operation of the distribution transformer, expressed as:

$$\sum_{v \in V_t} x_{v,k} P_{v,k} + \sum_{\phi \in \{A,B,C\}} P_{b,t}^\phi \le P_{max}, \forall k \in T_t;$$

S222, three-phase load balance constraint: maintaining the negative sequence voltage imbalance of the power grid not exceeding 2% during normal operation and not exceeding 4% for short periods, characterizing by calculating a ratio of the maximum difference of three-phase current to the average value of three-phase current, and transforming non-linear constraint into linear constraint, specifically comprising:

S2221, calculating the each-phase total load: calculating a total load of each phase comprising basic load and charging load at the time step t, expressed as:

$$P_t^\phi = P_{b,t}^\phi + \sum_{v \in V_t^\phi} x_{v,t} P_{v,t}, \forall \phi \in \{A, B, C\};$$

wherein $P_{b,t}^\Phi$ is the basic load of the phase $\Phi$, $V_t^\Phi$ represents the electric vehicle assembly connected to a $\Phi$-phase charging pile;

S2222, calculating a three-phase imbalance: calculating the t-time three-phase imbalance z/t by using the load power imbalance, expressed as:

$$\psi_r = \frac{\max_{\phi \in \{A,B,C\}} P_t^\phi - \min_{\phi \in \{A,B,C\}} P_t^\phi}{\frac{1}{3}\sum_{\Phi \in \{A,B,C\}} P_t^\phi};$$

S2223, setting the three-phase imbalance constraint: setting the maximum three-phase imbalance as $\Psi_{max}$ to satisfy the three-phase imbalance $\psi_k \geq \Psi_{max}$, $\forall k \in T_t$ at any time $k \in T_t$;

S2224, transforming into linear constraint: defining the average value of three-phase load at time step t as $$\bar{P} = \frac{1}{3}\sum_{\Phi \in \{A,B,C\}} P_t^\phi,$$

transforming the non-linear constraint of the three-phase imbalance into a plurality of absolute value constraints by calculating the load difference between every two phases at each time step k, expressed as:

$$\frac{|P_k^A - P_k^B|}{\bar{P}_k} \leq \psi_{max} \forall k \in T_t;$$

$$\frac{|P_k^B - P_k^C|}{\bar{P}_k} \leq \psi_{max} \forall k \in T_t;$$

$$\frac{|P_k^C - P_k^A|}{\bar{P}_k} \leq \psi_{max} \forall k \in T_t;$$

S2225, transforming into a linear equation: transforming an absolute value constraint into a linear constraint, expressed as:

$$-\bar{P}_k \Psi_{max} \leq P_k^A - P_k^B \leq \bar{P}_k \Psi_{max}.$$

4. The large-scale electric vehicle cluster coordinated charging optimization method based on greedy repair genetic algorithm according to claim 3, wherein constructing the objective function and the mathematical transformation in the S3 comprises:

S31, designing objective function: wherein the direct optimization goal of the coordinated charging system is to minimize the users' charging costs, and under the time-of-use electricity pricing mechanism, the charging rates vary in a stepped manner over time; setting the charging unit price charged to the user at the time step t as $\rho_t$ yuan/kWh, expressed as:

$$\rho_t = \rho_t^r + \rho_t^s;$$

wherein $\rho_t^r$ is the current electricity price (yuan/kWh) under the time-of-use electricity price mechanism and $\rho_t^s$ is the current service cost unit price (yuan/kWh);

S32, calculating the single-time step charging fee: if the electric vehicle $v \in V_t$ is charged in the time step $k \in T_t$, the cost in the time step k is $\rho_k P_v \Delta_t$;

S33, calculating the total charging cost: in a finite time domain $T_t$, calculating the total charging cost of all electric vehicles, expressed as:

$$f(X) = \Sigma_{k \in T_t} \Sigma_{v \in V_t} x_{v,k} \rho_k P_v \Delta_t;$$

wherein X represents a set of decision variables;

S34, constructing an optimization problem: summarizing the optimization problem of coordinated charging at the time step t, expressed as:

$$\min_X f(X)$$

subject to:

$$x_{v,k} = 0, \forall k \in T_t \text{ and } k > t_v^d, v \in V_t;$$

$$s_{v,k} = s_{v,k-1} + x_{v,k}\frac{\eta_v P_v \Delta_t}{E_v}, \forall k \in T_t;$$

$$s_{v,k} \leq s_v^d, \forall k \in T_t;$$

$$s_{v,t_v^d} = h(s_v^{(i)}), \text{ if } t + T_t - 1 \geq t_v^d;$$

$$s_{v,t+T_t-1} = h(s_{v,t+T-1}^d), \text{ if } t + T_t - 1 \leq t_v^d;$$

$$\sum_{v \in V_t} x_{v,k} P_{v,k} + \sum_{\phi \in \{A,B,C\}} P_{b,t}^\phi \leq P_{max}, \forall k \in T_t;$$

$$\frac{|P_k^A - P_k^B|}{\bar{P}_k} \leq \psi_{max} \forall k \in T_t;$$

$$\frac{|P_k^B - P_k^C|}{\bar{P}_k} \leq \psi_{max} \forall k \in T_t;$$

$$\frac{|P_k^C - P_k^A|}{\bar{P}_k} \leq \psi_{max} \forall k \in T_t.$$

5. The large-scale electric vehicle cluster coordinated charging optimization method based on greedy repair genetic algorithm according to claim 4, wherein solving the constrained optimization problem in the S4 comprises:

S41, initializing a population: when the population $P_0$ is initialized, sequentially generating a decision vector $x_v$ of each electric vehicle according to the $t_v^d$ of each electric vehicle and a matrix K, so as to meet the battery SOC constraint;

S42, calculating population fitness: calculating a population fitness value of a parent population $P_t$;

S43, judging a termination condition: determining whether a termination evolution condition is reached, outputting an optimization result if the termination evolution condition is reached, and continuing execution if the termination evolution condition is not reached;

S44, generating a sub-population: generating the sub-population $Q_t$ through crossover, mutation and repair;

S45, calculating a sub-population fitness: calculating a population fitness value of the sub-population $Q_t$;

S46, elite strategy: adopting an elite strategy to generate $P_{t+1}$; and

S47, the number of iterations: setting t=t+1, wherein the number of iterations is increased by 1, and returning to judge the termination condition.

6. The large-scale electric vehicle cluster coordinated charging optimization method based on greedy repair genetic algorithm according to claim 5, wherein the initializing the population in the S41 comprises:

S411, judging whether the vehicle is the last vehicle or not: judging whether the vehicle is the last electric vehicle or not, if the vehicle is the last electric vehicle, outputting the decision variable X, and if the vehicle is not the last electric vehicle, continuing to execute;

S412, determining a decision vector dimension: determining a dimension $n_v$ of the decision vector $x_v$ of the electric vehicle v according to the time domain $T_t$ and $t_v^d$;

S413, determining charging times: determining the charging times $k_v$ of the electric vehicle v according to the matrix K;

S414, generating a random vector: generating an $n_v$-dimensional random vector $x_v$;

S415, setting a charging period: finding a $k_v$-th large number $x_k$ in $x_v$, setting all values greater than $x_k$ to 0, and all values not greater than $x_k$ to 1; and S416, adding the decision variable set: adding the decision vector $x_v$ to the decision variable X, and returning to judge whether the vehicle is the last vehicle.

7. The large-scale electric vehicle cluster coordinated charging optimization method based on greedy repair genetic algorithm according to claim 6, wherein the repair in S44 comprises repairing the each-phase total load constraint and repairing the three-phase load balance degree constraint, the repairing the each-phase total load constraint is operated by adopting a Repair_load operation, a moment with a maximum total load is repaired each time; and the three-phase load balance degree constraint is operated by adopting a Repair_imbalance operation, and a moment with a maximum three-phase load balance is repaired each time.

8. The large-scale electric vehicle cluster coordinated charging optimization method based on greedy repair genetic algorithm according to claim 7, wherein the Repair_load operation comprises:

finding a maximum load moment: finding the moment with the maximum total load $t_{max}$;

judging whether a total load $P_{max}$ of $t_{max}$ is greater than a maximum load upper limit $P_{limit}$ or not, if yes, continuing to execute, and otherwise, outputting a repaired decision variable X;

randomly selecting a charging vehicle: randomly selecting a charged electric vehicle $v_{rand}$ at a moment $t_{max}$;

selecting a time period according to the electricity price: selecting a time period $t_{rand}$ from a low to high probability of the electricity price in a decision vector $x_{v_{rand}}$ of the electric vehicle $v_{rand}$; and performing switching operation: performing swap operation on two moments $t_{max}$ and $t_{rand}$ in the decision vector $x_{v_{rand}}$ of the electric vehicle $v_{rand}$, and returning to find the maximum load moment;

the Repair_imbalance operation comprises:

finding a maximum balance moment: finding the moment with the maximum three-phase load balance $t_{max}$;

judging whether the three-phase load balance at the moment $t_{max}$ is greater than a maximum three-phase load balance upper limit $Imbalance_{limit}$, if yes, continuing to execute, and otherwise, outputting the repaired decision variables X;

determining maximum and minimum phases: determining a maximum phase $\Phi_{max}$ and a minimum phase $\Phi_{min}$ of a load at the moment $t_{max}$;

randomly selecting vehicles: randomly selecting a charged electric vehicle $v_{max}$ with the maximum phase $\Phi_{max}$ and an uncharged electric vehicle $v_{min}$, with the minimum phase $\Phi_m$ in and adhering to a maximum load limit after charging at the moment $t_{max}$;

selecting a time period according to the electricity price: selecting a moment $t_{maxrand}$ where an uncharged electric vehicle maintains the maximum load limit after charging according to the low to high probability of the electricity price in a decision vector $x_{v_{max}}$ of the electric vehicle $v_{max}$;

selecting a charging time period: selecting a charging time $t_{minrand}$ in a decision vector $x_{v_{min}}$ of the electric vehicle $v_{min}$ according to a high to low probability of the electricity price;

judging whether a required $t_{maxrand}$ and the electric vehicle $v_{min}$ exist or not, if not, outputting unrepaired decision variables, and if yes, continuing to execute;

performing swap operation on two moments $t_{max}$ and $t_{maxrand}$ in a decision vector $x_{v_{max}}$ of the electric vehicle $v_{max}$; and performing swap operation on two moments $t_{max}$ and $t_{minrand}$ in a decision vector $x_{v_{min}}$ of the electric vehicle $v_{min}$, and returning to find the maximum balance moment.

9. A large-scale electric vehicle cluster coordinated charging optimization method based on greedy repair genetic algorithm, comprising the following steps:

S1, establishing a task model of electric vehicle cluster coordinated charging in large charging stations according to task characteristics of electric vehicle charging, comprising:

S11, adopting a discrete-time system setting, defining a sampling period length as $\Delta_t$, comprising 5 minutes, 10 minutes, 15 minutes, half an hour and one hour, indexing each time period with a positive integer t≥1, regarding a basic load, a connection state of the electric vehicle and a charging pile, and a charging power and an electricity price of an electric vehicle as constant values under the discrete-time system setting and in each time period with a length $\Delta_t$;

S12, starting a scheduling interval for electric vehicle coordinated charging from a current time step t and lasting until a time step t+T;

S13, defining a charging task $d_v$ for the electric vehicle v when the electric vehicle v enters the garage and is connected to the charging pile, expressed as:

$$d_v = (v, t_v^a, t_v^d, s_v^a, s_v^d, E_v, P_v, \eta_v, i_v, \Phi_v);$$

wherein $t_v^a$ is a plug-in time when the electric vehicle v arrives at the garage to connect the charging pile and get ready for charging, and $t_v^d$ is a plug-out time of the electric vehicle v; $s_v^a$ is an initial SOC of a battery when the electric vehicle v arrives at the garage, $s_v^d$ is an expected SOC when the electric vehicle v is plugged out; $E_v$ is a battery capacity of the electric vehicle v, $P_v$ is the charging power of the electric vehicle v, $\eta_v \in [0,1]$ is a charging efficiency of the battery of the electric vehicle v, and $i_v$ is the number of the charging pile connected to the electric vehicle v, and $\Phi_v \in \{A, B, C\}$ is a charging load phase of the electric vehicle v;

S14, defining a decision variable matrix X for V vehicles when the V vehicles enter the garage and are connected to charging piles, expressed as:

$$X = \begin{pmatrix} x_{11} & \cdots & x_{1T} \\ \vdots & \ddots & \vdots \\ x_{V1} & \cdots & x_{VT} \end{pmatrix}_{V \times T} \quad x_{v,t} \in \{0, 1\};$$

wherein V is the number of rows in the decision variable matrix X, and T is the number of columns in the decision variable matrix X, $x_{v,t} \in \{0,1\}$ indicates an on-off state of the charging pile $i_v$ at the current time step t; and S15, defining $T_t$ as a set of time steps comprised in the finite time domain of coordinated charging from the current time step t, expressed as:

$$T_t = \{t, t+1, \ldots, t+T_t-1\}$$

S2, constructing constraint conditions for a coordinated charging optimization problem according to principles of guaranteeing stable operation of a power distribution network and meeting a charging requirement of the electric vehicle, wherein the constructing the constraint conditions in the S2 comprises:

S21, meeting relevant constraints of a electric vehicle charging task, comprising a charging time constraint and a battery state of charge (SOC) constraint; and S22, meeting relevant constraints of a safe and stable operation of the power distribution network, comprising an each-phase total load constraint and a three-phase load balance degree constraint of a distribution transformer;

S3, constructing a constrained optimization problem: designing an objective function with a minimum charging cost, performing linear mathematical transformation on non-linear constraint conditions, and constructing a 0/1 integer linear programming problem;

S4, solving the constrained optimization problem: carrying out genetic coding on a decision model of a charging station to obtain a coded decision model of the charging station, and designing a genetic algorithm with greedy repair operators to solve the constructed constrained optimization problem, wherein solving the constrained optimization problem in the S4 comprises:

S41, initializing a population: when the population $P_0$ is initialized, sequentially generating a decision vector $x_v$ of each electric vehicle according to an expected plug-out time $t_v^d$ of each electric vehicle and a matrix K, so as to meet the battery SOC constraint;

S42, calculating population fitness: calculating a population fitness value of a parent population $P_t$;

S43, judging a termination condition: determining whether a termination evolution condition is reached, outputting an optimization result if the termination evolution condition is reached, and continuing execution if the termination evolution condition is not reached;

S44, generating a sub-population: generating the sub-population $Q_t$ through crossover, mutation and repair, wherein the repair in S44 comprises repairing the each-phase total load constraint and repairing the three-phase load balance degree constraint, the repairing the each-phase total load constraint is operated by adopting a Repair_load operation, a moment with a maximum total load is repaired each time; and the three-phase load balance degree constraint is operated by adopting a Repair_imbalance operation, and a moment with a maximum three-phase load balance is repaired each time;

wherein the Repair_load operation comprises:
  finding a maximum load moment: finding the moment with the maximum total load $t_{max}$;
  judging whether a total load $P_{max}$ of $t_{max}$ is greater than a maximum load upper limit $P_{limit}$ or not, if yes, continuing to execute, and otherwise, outputting a repaired decision variable X;
  randomly selecting a charging vehicle: randomly selecting a charged electric vehicle $v_{rand}$ at a moment $t_{max}$;
  selecting a time period according to the electricity price: selecting a time period $t_{rand}$ from a low to high probability of the electricity price in a decision vector $x_{v_{rand}}$ of the electric vehicle $v_{rand}$; and
  performing switching operation: performing swap operation on two moments $t_{max}$ and $t_{rand}$ in the decision vector $x_{v_{rand}}$ of the electric vehicle $v_{rand}$, and returning to find the maximum load moment;

wherein the Repair_imbalance operation comprises:
  finding a maximum balance moment: finding the moment with the maximum three-phase load balance $t_{max}$;
  judging whether the three-phase load balance at the moment $t_{max}$ is greater than a maximum three-phase load balance upper limit $Imbalance_{limit}$, if yes, continuing to execute, and otherwise, outputting the repaired decision variables X;
  determining maximum and minimum phases: determining a maximum phase $\Phi_{max}$ and a minimum phase $\Phi_{min}$ of a load at the moment $t_{max}$;
  randomly selecting vehicles: randomly selecting a charged electric vehicle $v_{max}$ with the maximum phase $\Phi_{max}$ and an uncharged electric vehicle $v_{min}$, with the minimum phase $\Phi_{min}$ and adhering to a maximum load limit after charging at the moment $t_{max}$;
  selecting a time period according to the electricity price: selecting a moment $t_{maxrand}$ where an uncharged electric vehicle maintains the maximum load limit after charging according to the low to high probability of the electricity price in a decision vector $x_{v_{max}}$ of the electric vehicle $v_{max}$;
  selecting a charging time period: selecting a charging time $t_{minrand}$ in a decision vector $x_{v_{min}}$ of the electric vehicle $v_{min}$ according to a high to low probability of the electricity price;
  judging whether a required $t_{maxrand}$ and the electric vehicle $v_{min}$ exist or not, if not, outputting unrepaired decision variables, and if yes, continuing to execute;
  performing swap operation on two moments $t_{max}$ and $t_{maxrand}$ in a decision vector $x_{v_{max}}$ of the electric vehicle $v_{max}$; and
  performing swap operation on two moments $t_{max}$ and $t_{minrand}$ in a decision vector $x_{v_{min}}$ of the electric vehicle $v_{min}$, and returning to find the maximum balance moment;

S45, calculating a sub-population fitness: calculating a population fitness value of the sub-population $Q_t$;

S46, elite strategy: adopting an elite strategy to generate $P_{t+1}$; and

S47, the number of iterations: setting t=t+1, wherein the number of iterations is increased by 1, and returning to judge the termination condition; and S5, controlling, based on the constraint conditions for the coordinated charging optimization problem and the coded decision model of the charging station, the charging station to charge for a target electric vehicle cluster, thereby reasonably scheduling a charging time and an order of the target electric vehicle cluster and improving performance of the charging station.

* * * * *